(12) United States Patent
Che et al.

(10) Patent No.: US 10,996,976 B2
(45) Date of Patent: May 4, 2021

(54) SYSTEMS AND METHODS FOR SCHEDULING NEURAL NETWORKS BY VARYING BATCH SIZES

(71) Applicant: ALIBABA GROUP HOLDING LIMITED, Grand Cayman (KY)

(72) Inventors: Shuai Che, San Mateo, CA (US); Guoyang Chen, San Mateo, CA (US); Yingmin Li, San Mateo, CA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 98 days.

(21) Appl. No.: 16/376,694

(22) Filed: Apr. 5, 2019

(65) Prior Publication Data

US 2020/0319919 A1   Oct. 8, 2020

(51) Int. Cl.
| | | |
|---|---|---|
| *G06F 9/46* | (2006.01) |
| *G06F 9/48* | (2006.01) |
| *G06N 3/04* | (2006.01) |
| *G06K 9/62* | (2006.01) |
| *G06F 16/9035* | (2019.01) |
| *G06F 11/36* | (2006.01) |
| *G06F 9/38* | (2018.01) |

(52) U.S. Cl.
CPC .............. *G06F 9/4843* (2013.01); *G06F 9/38* (2013.01); *G06F 11/3612* (2013.01); *G06F 11/3616* (2013.01); *G06F 16/9035* (2019.01); *G06K 9/6215* (2013.01); *G06N 3/04* (2013.01)

(58) Field of Classification Search
CPC ............. G06F 11/3409; G06F 11/0709; G06F 11/3466; G06F 11/3612; G06F 11/3616; G06F 9/4843; G06F 9/38; G06F 9/6215; G06F 16/9035; G06K 9/66; G06T 1/20; G06T 15/005; G16B 50/00; G06N 3/04
See application file for complete search history.

(56) References Cited

U.S. PATENT DOCUMENTS

| | | | | |
|---|---|---|---|---|
| 2005/0055193 A1* | 3/2005 | Bondarenko | .......... | G16B 50/00 703/22 |
| 2012/0197626 A1* | 8/2012 | Kejariwal | ........... | G06F 11/3466 703/22 |
| 2016/0162760 A1* | 6/2016 | Skaff | ........................ | G06K 9/66 382/159 |
| 2017/0140262 A1 | 5/2017 | Wilson et al. | | |

(Continued)

OTHER PUBLICATIONS

PCT International Search Report and Written Opinion dated Jun. 30, 2020, issued in corresponding International Application No. PCT/US2020/026158 (13 pgs.).

*Primary Examiner* — Tuan A Vu
(74) *Attorney, Agent, or Firm* — Finnegan, Henderson, Farabow, Garrett & Dunner, LLP (57) ABSTRACT

The present disclosure relates to computer-implemented systems and methods for scheduling a neural network for execution. In one implementation, a system for scheduling a neural network for execution may include at least one memory storing instructions and at least one processor configured to execute the instructions to determine a profile for one or more applications co-scheduled with at least one neural network; determine a batch size for the at least one neural network based on the determined profile for the one or more applications; and scheduling the one or more applications and the at least one neural network based on the batch size.

20 Claims, 8 Drawing Sheets

(56) References Cited

U.S. PATENT DOCUMENTS

| | | | |
|---|---|---|---|
| 2018/0060202 A1* | 3/2018 | Papak | G06F 11/0709 |
| 2018/0314935 A1 | 11/2018 | Lewis et al. | |
| 2018/0322386 A1* | 11/2018 | Sridharan | G06T 15/005 |
| 2019/0278679 A1* | 9/2019 | Chu | G06F 11/3409 |
| 2020/0043123 A1* | 2/2020 | Dash | G06T 1/20 |

* cited by examiner

| Function Calls 301 | Inputs 303 | Outputs 305 | Application 307-1 | Application 307-2 | ... | Application 307-n |
|---|---|---|---|---|---|---|
| | | | • • • | • • • | | • • • |

SYSTEMS AND METHODS FOR SCHEDULING NEURAL NETWORKS BY VARYING BATCH SIZES

TECHNICAL FIELD

The present disclosure relates generally to the field of application scheduling. More specifically, and without limitation, this disclosure relates to computer-implemented systems and methods for co-scheduling neural networks and other applications. The systems and methods disclosed herein may be used in various neural network-based architectures, such as deep neural networks (DNNs), convolutional neural networks (CNNs), recurrent neural networks (RNNs), or the like.

BACKGROUND

Modern servers and other computers run many tasks in parallel or at least concurrently. Parallelism and concurrency increase efficiency as compared with single-stream execution. However, different levels of efficiency may be obtained depending on schedules governing the parallelism or concurrency. Neural networks include an additional layer of complexity. Depending on the batch size of inputs to neural networks, the execution of neural networks may require different levels of memory or processing cycles. This may impact the level of efficiency obtained when executing one or more neural network in parallel or concurrently, whether with each other or with other applications.

SUMMARY

In some embodiments, a system for scheduling a neural network for execution may comprise at least one memory storing instructions and at least one processor configured to execute the instructions to perform operations. The operations may comprise determine a profile for one or more applications co-scheduled with at least one neural network; determine a batch size for the at least one neural network based on the determined profile for the one or more applications; and schedule the one or more applications and the at least one neural network based on the batch size.

In some embodiments, a method for scheduling a neural network for execution may comprise determining a profile for one or more applications co-scheduled with at least one neural network; determining a batch size for the at least one neural network based on the determined profile for the one or more applications; and scheduling the one or more applications and the at least one neural network based on the batch size.

In some embodiments, a non-transitory computer-readable storage medium may store a set of instructions that is executable by at least one processor to cause the processor to perform a method for scheduling a neural network for execution. The method may comprise determining a profile for one or more applications co-scheduled with at least one neural network; determining a batch size for the at least one neural network based on the determined profile for the one or more applications; and scheduling the one or more applications and the at least one neural network based on the batch size.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the principles and features of the disclosed embodiments. In the drawings.

DETAILED DESCRIPTION

The disclosed embodiments relate to computer-implemented systems and methods for scheduling neural networks for parallel or concurrent execution. Advantageously, the exemplary embodiments can provide improved efficiency by optimizing input batch sizes to neural networks co-scheduled with other neural networks or other applications. Embodiments of the present disclosure may be implemented and used in any neural network-based architectures. Accordingly, although described in reference to deep neural networks (DNNs), other neural network-based architectures, such as convolutional neural networks (CNNs), recurrent neural networks (RNNs), or the like, may be co-scheduled using the techniques disclosed herein to optimize input batch size.

In view of the foregoing issues with conventional systems, embodiments of the present disclosure provide computer-implemented systems and methods for co-scheduling neural networks with other applications with optimized batch input sizes. The systems and methods of the present disclosure may provide a technical solution to the technical problem of improving the efficiency of concurrent or parallel execution of applications with one or more neural networks. The systems and methods of the present disclosure may result in more efficient runtime schedules.

Figure 1:
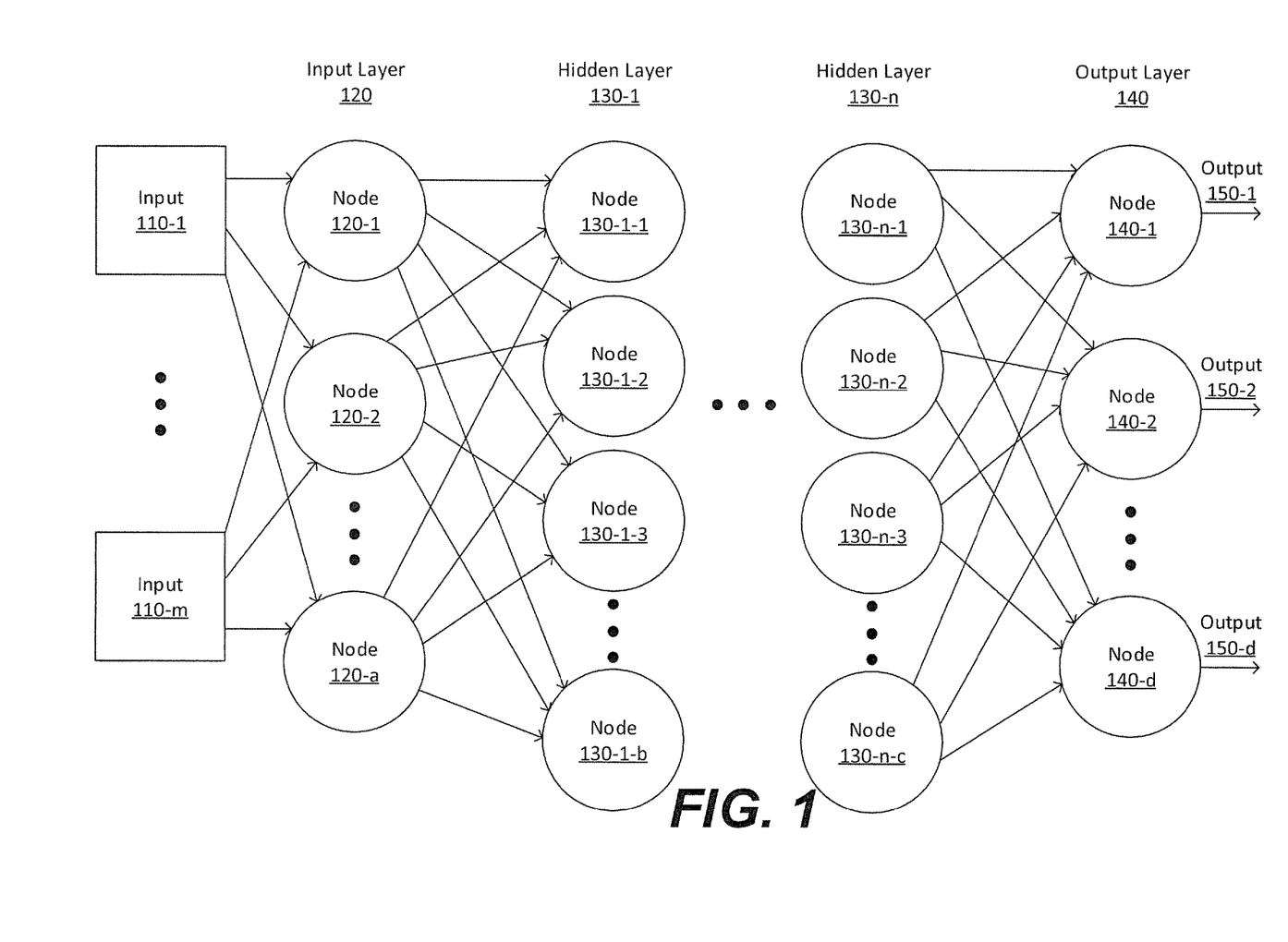
FIG. 1 is a schematic representation of a neural network, according to embodiments of the present disclosure.

FIG. 1 is a schematic representation of an artificial neural network (ANN) 100. As depicted in FIG. 1, neural network 100 may include an input layer 120 that accepts inputs, e.g., input 110-1, . . . , input 110-m. Inputs may include an image, text, or any other structure or unstructured data for processing by neural network 100. In some embodiments, neural network 100 may accept a plurality of inputs simultaneously. For example, in FIG. 1, neural network 100 may accept up to m inputs simultaneously. Additionally or alternatively, input layer 120 may accept up to m inputs in rapid succession, e.g., such that input 110-1 is accepted by input layer 120 in one cycle, a second input is accepted by input layer 120 in a second cycle in which input layer 120 pushes data from input 110-1 to a first hidden layer, and so on. The number of inputs used in simultaneous input, rapid succession input, and any combination thereof may be referred to as the "batch size" for neural network 100.

Input layer 120 may comprise one or more nodes, e.g., node 120-1, node 120-2, . . . , node 120-a. Each node may apply an activation function to corresponding input (e.g., one or more of input 110-1, . . . , input 110-m) and weight the output from the activation function by a particular weight associated with the node. An activation function may comprise a Heaviside step function, a Gaussian function, a multiquadratic function, an inverse multiquadratic function, a sigmoidal function, or the like. A weight may comprise a positive value between 0.0 and 1.0 or any other numerical value configured to allow some nodes in a layer to have corresponding output scaled more or less than output corresponding to other nodes in the layer.

As further depicted in FIG. 1, neural network 100 may include one or more hidden layers, e.g., hidden layer 130-1, . . . , hidden layer 130-n. Each hidden layer may comprise one or more nodes. For example, in FIG. 1, hidden layer 130-1 comprises node 130-1-1, node 130-1-2, node 130-1-3, . . . , node 130-1-b, and hidden layer 130-n comprises node 130-n-1, node 130-n-2, node 130-n-3, . . . , node 130-n-c. Similar to nodes of input layer 120, nodes of the hidden layers may apply activation functions to output from connected nodes of the previous layer and weight the output from the activation functions by particular weights associated with the nodes.

As further depicted in FIG. 1, neural network 100 may include an output layer 140 that finalizes outputs, e.g., output 150-1, output 150-2, . . . , output 150-d. Output layer 140 may comprise one or more nodes, e.g., node 140-1, node 140-2, . . . , node 140-d. Similar to nodes of input layer 120 and of the hidden layers, nodes of output layer 140 may apply activation functions to output from connected nodes of the previous layer and weight the output from the activation functions by particular weights associated with the nodes.

Although depicted as fully connected in FIG. 1, the layers of neural network 100 may use any connection scheme. For example, one or more layers (e.g., input layer 120, hidden layer 130-1, . . . , hidden layer 130-n, output layer 140, or the like) may be connected using a convolutional scheme, a sparsely connected scheme, or the like. Such embodiments may use fewer connections between one layer and a previous layer than depicted in FIG. 1.

Figure 2:
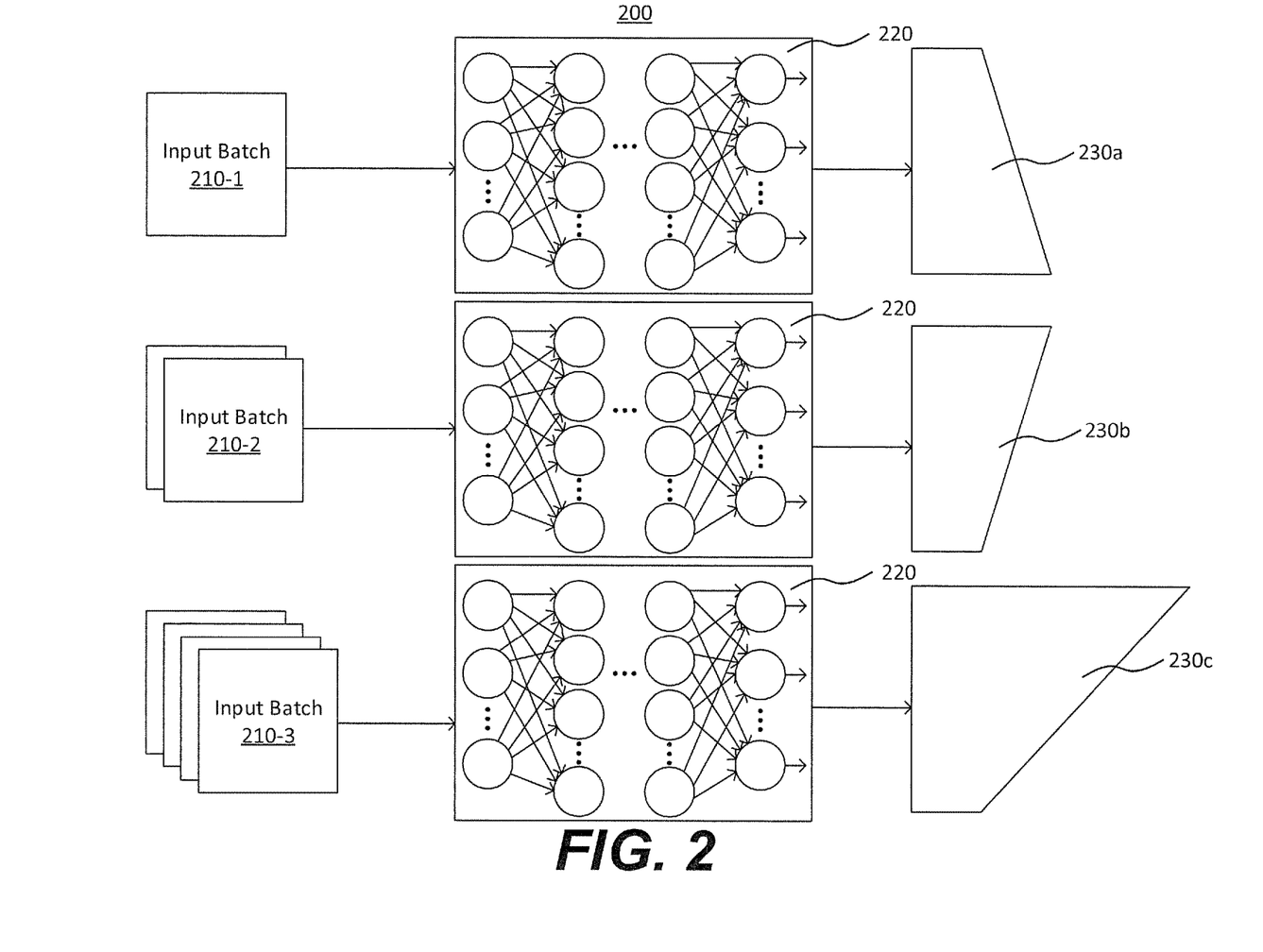
FIG. 2 is a schematic representation of runtime profiles for a neural network associated with different input batch sizes, according to embodiments of the present disclosure.

FIG. 2 is a representation of a relation 200 between a batch input size for a neural network 220 (which may comprise, e.g., neural network 100 of FIG. 1) and a runtime profile for neural network 220, consistent with embodiments of the present disclosure. As depicted in FIG. 2, at least one batch size (e.g., batch size 210-1) may result in neural network 200 being more memory-intensive than processor-intensive (e.g., as shown in profile 230a). The memory-intensive quality of neural network 220 may be assessed in one or more ways, such as a total amount of memory used, a maximum amount of memory used, memory usage per unit of time (e.g., per second, per millisecond, per processing cycle, or the like), or any other measure or combination of measures related to memory usage. The processor-intensive quality of neural network 220 may be assessed in one or more ways, such as a total amount of processing capacity used, a maximum amount of processing capacity used, processing capacity used per unit of time (e.g., per second, per millisecond, per clock cycle, or the like), or any other measure or combination of measures related to processor usage. As further depicted in FIG. 2, at least one batch size (e.g., batch size 210-2) may result in neural network 200 being more processor-intensive than memory-intensive (e.g., as shown in profile 230b). Other profiles may be even more processor-intensive than profile 230b (such as shown in profile 230c) or even more memory-intensive than profile 230a (not shown). As further explained below, when co-scheduling two applications (e.g., one application having a fixed behavior while the other application having a more flexible behavior based on the batch size), it may be preferable to co-schedule a more processor-intensive application with a more memory-intensive application in order to provide more efficient scheduling.

Although depicted using memory- and processor-related qualities in the runtime profile, additional or alternative measures may be included. For example, the network-intensive quality of neural network 220 may be included and assessed in one or more ways, such as a total amount of network capacity used, a maximum amount of network capacity used, network capacity use per unit of time (e.g., per second, per millisecond, per processing cycle, or the like), or any other measure or combination of measures related to network usage. In another example, the disk-intensive quality of neural network 220 may be included and assessed in one or more ways, such as a total amount of reads and writes to the disk, a total number of reads and writes to the disk, disk usage per unit of time (e.g., per second, per millisecond, per processing cycle, or the like), or any other measure or combination of measures related to usage of the disk (such as a hard disk, a flash memory, a digital versatile disc (DVD), or the like).

Although depicted as runtime profiles in FIG. 2, any profile may be used. For example, any data structure describing one or more hardware requirements (e.g., based on documentation or the like) or usages (e.g., based on current or previous runtime tests or the like) may be used. As explained above, any desired hardware measure may be included in the data structure.

Figure 3:
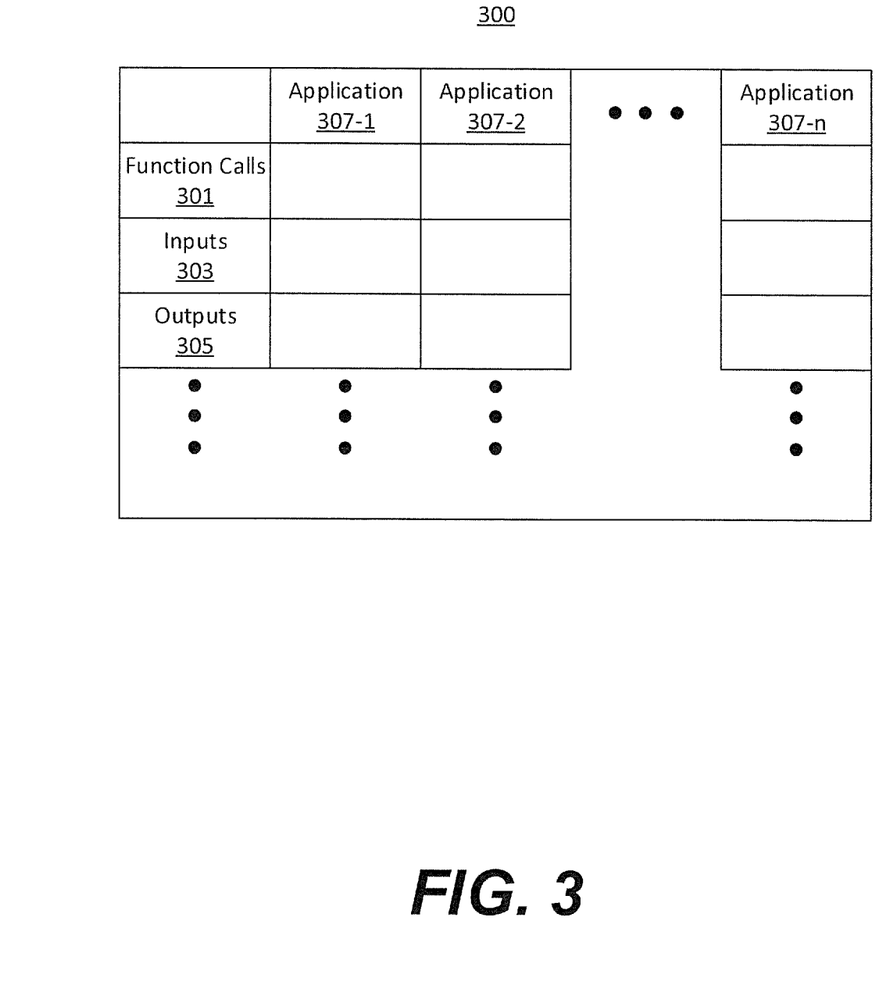
FIG. 3 is a schematic representation of a relational database of application characteristics, according to embodiments of the present disclosure.

FIG. 3 is a representation of a database 300 for storing characteristics of applications, consistent with embodiments of the present disclosure. For example, database 300 may be used to identify one or more applications similar to an application not in database 300 in order to use a profile associated with the one or more similar applications rather than testing the application not in database 300 to generate a profile.

As depicted in FIG. 3, database 300 may include a plurality of applications, e.g., application 307-1, application 307-2, . . . , application 307-n. Although not depicted in FIG. 3, database 300 may also store or link to a profile for each application (e.g., including memory-intensive qualities, processor-intensive qualities, network-intensive qualities, or the like based on previous runtime tests performed on the application). As depicted in FIG. 3, database 300 may store one or more characteristics in association with each application. For example, as depicted in FIG. 3, a number or type (e.g., recursive, by value, by reference, by result, by value-result, by name, by constant value, or the like) of function calls (also called subroutine calls) within an application may comprise characteristic 301. Moreover, as further depicted in FIG. 3, a number or type (e.g., strings, integers, decimals, Booleans, or the like) of inputs to the application or to one or more subroutines of the application may comprise characteristic 303. Similarly, a number or type (e.g., strings, integers, decimals, Booleans, or the like) of outputs from the application or from one or more subroutines of the application may comprise characteristic 305. Database 300 may store additional or alternative characteristics. For example, database 300 may store identities of pre-built libraries used by each application; a number of floating-point arithmetic operations, string operations, integer operations, or other operations performed by each application; or the like.

To determine a most similar application from database 300 to an application not stored in database 300, any appropriate comparison technique may be used. For example, the most similar application may comprise an application with a total distance (e.g., a sum of the distance from each characteristic of the most similar application to a corresponding characteristic of the application not stored in database 300) that is smallest as compared with the other applications in database 300. As used herein, distance may refer to Euclidean distance, Lebesgue distance, or the like. In another example, the most similar application may comprise an application with a maximal number of distances (e.g., from each characteristic of the most similar application to a corresponding characteristic of the application not stored in database 300) that are smallest as compared with corresponding distances for the other applications in database 300. Any other clustering algorithms may be applied to the one or more characteristics to determine the most similar application from database 300.

In other embodiments, an earlier version of an application (e.g., an earlier version of a Microsoft® Word executable or an Adobe® Acrobat executable, or the like) may be selected as the most similar application. In a combination of such embodiments, the earlier version may be selected as the default most similar application and only overridden if another application in database 300 is the most similar by more than a threshold (e.g., applied to the total distance, one or more of the smallest distances, or any other measure from one or more clustering algorithms).

In some embodiments, in lieu of database 300 depicted in FIG. 3, embodiments of the present disclosure may use feature vector comparison to identify a most similar application with a stored profile. For example, the one or more characteristics for an application may form a multi-dimensional feature vector associated with the application. Accordingly, the most similar application from database 300 may comprise the application having a feature vector that is closest to a feature vector associated with the application not stored in database 300. Any other classification algorithms may be applied to the feature vectors to determine the most similar application from database 300.

Figure 4:
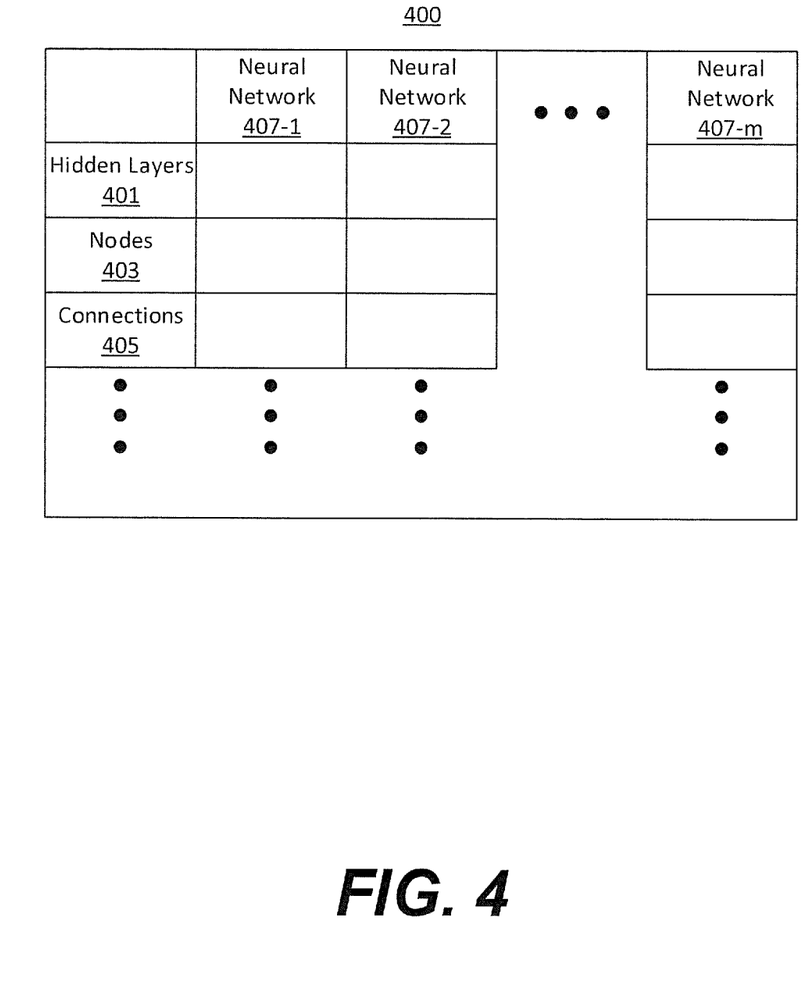
FIG. 4 is a schematic representation of a relational database of neural network characteristics, according to embodiments of the present disclosure.

FIG. 4 is a representation of a database 400 for storing characteristics of neural networks, consistent with embodiments of the present disclosure. For example, database 400 may be used to identify one or more neural networks similar to a neural network not in database 400 in order to use a profile associated with the one or more similar neural networks rather than testing the neural network not in database 400 to generate a profile.

As depicted in FIG. 4, database 400 may include a plurality of neural networks, e.g., neural network 407-1, neural network 407-2, . . . , neural network 407-m. Although not depicted in FIG. 4, database 400 may also store or link to a profile for each neural network (e.g., including memory-intensive qualities, processor-intensive qualities, network-intensive qualities, or the like based on previous runtime tests performed on the application). The profile may include the quality sets corresponding to a plurality of batch input sizes for the neural network. Accordingly, the profile may allow for selection of a batch input size to achieve a particular set of qualities.

As depicted in FIG. 4, database 400 may store one or more characteristics in association with each neural network. For example, as depicted in FIG. 4, a number or type (e.g., convolutional, fully connected, max-pooling, or the like) of hidden layers within a neural network may comprise characteristic 401. Moreover, as further depicted in FIG. 4, a number (e.g., total, per layer, or the like) or characteristic (e.g., an activation function, weight, or the like) of nodes in the neural network may comprise characteristic 403. Moreover, as further depicted in FIG. 4, a connection scheme (e.g., per layer, overall, or the like) of the neural network may comprise characteristic 405. Database 400 may store additional or alternative characteristics. For example, database 400 may store a type of input to each neural network, a type of output from each neural network, a size of type of data set used to train each neural network, or the like.

To determine a most similar neural network from database 400 to a neural network not stored in database 400, any appropriate comparison technique may be used. For example, the most similar neural network may comprise a neural network with a total distance (e.g., a sum of the distance from each characteristic of the most similar neural network to a corresponding characteristic of the neural network not stored in database 400) that is smallest as compared with the other neural networks in database 400. In another example, the most similar neural network may comprise a neural network with a maximal number of distances (e.g., from each characteristic of the most similar neural network to a corresponding characteristic of the neural network not stored in database 400) that are smallest as compared with corresponding distances for the other neural networks in database 400. Any other clustering algorithms may be applied to the one or more characteristics to determine the most similar neural network from database 400.

In other embodiments, an earlier version of a neural network (e.g., trained on a different data set, or the like) may be selected as the most similar neural network. In a combination of such embodiments, the earlier version may be selected as the default most similar neural network and only overridden if another neural network in database 400 is the most similar by more than a threshold (e.g., applied to the total distance, one or more of the smallest distances, or any other measure from one or more clustering algorithms).

In some embodiments, in lieu of database 400 depicted in FIG. 4, embodiments of the present disclosure may use feature vector comparison to identify a most similar neural network with a stored profile. For example, the one or more characteristics for a neural network may form a multi-dimensional feature vector associated with the neural network. Accordingly, the most similar neural network from database 400 may comprise the neural network having a feature vector that is closest to a feature vector associated with the neural network not stored in database 400. Any other classification algorithms may be applied to the feature vectors to determine the most similar neural network from database 400.

Figure 5A:
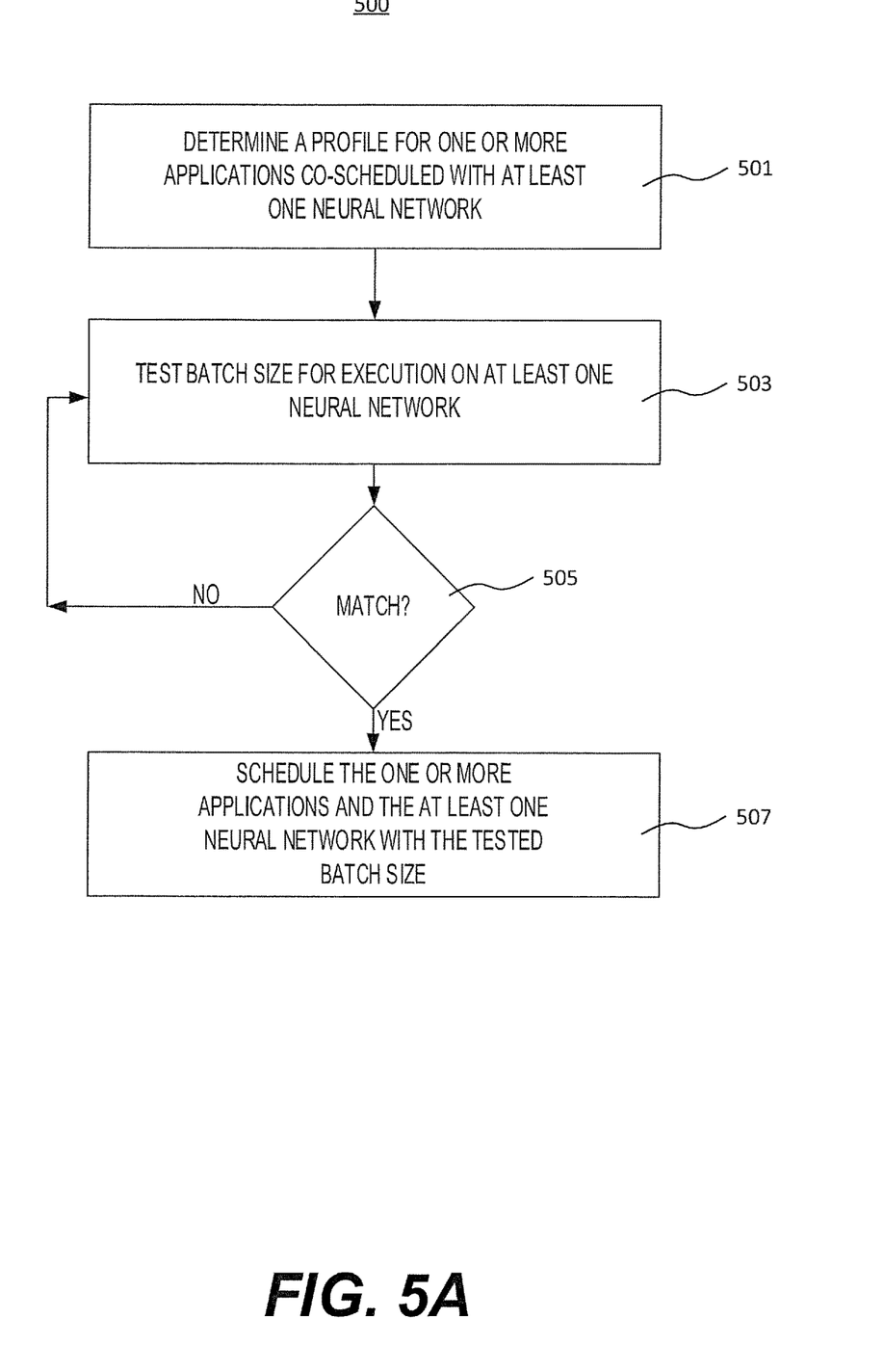
FIG. 5A is a flowchart of an exemplary method for scheduling a neural network for execution, according to embodiments of the present disclosure.

FIG. 5A is a flowchart of an exemplary method 500 for scheduling at least one neural network. Method 500 may be performed by at least one processor (e.g., processor 701 of FIG. 7). Although described as scheduling at least one neural network with one or more other applications, method 500 may be sued to schedule a plurality of neural networks together, a plurality of neural networks with one or more other applications, or the like.

At step 501, the at least one processor may determine a profile for one or more applications co-scheduled with at least one neural network. The profile may comprise a runtime profile or any other data structure describing one or more hardware requirements or usages for the one or more applications. For example, as explained above with respect to FIG. 3, the at least one processor may retrieve the profile from a database. For example, the at least one processor may retrieve a profile from a database of profiles based on one or more characteristics of the one or more applications and, when no profile in the database matches the one or more applications, select a profile associated with one or more characteristics most similar to the one or more characteristics of the one or more applications. To determine the one or more characteristics most similar to the one or more characteristics of the one or more applications, the at least one processor may use one or more clustering algorithms on the one or more characteristics of the application and those of applications in the database. For example, the at least one processor may determine the profile associated with one or more characteristics with a minimal total distance to the one or more characteristics of the one or more applications or determine the profile associated with one or more characteristics with minimal distances between each associated characteristic and a corresponding characteristic of the one or more characteristics of the one or more applications.

Additionally with or alternatively to using one or more clustering algorithms, the at least one processor may use feature vector comparison, e.g., by determining the profile having a feature vector based on one or more associated characteristics closest to a feature vector based on the one or more characteristics of the one or more applications. The closest feature vector may be determined using a multi-dimensional distance, as explained above with respect to FIG. 3. The dimensions may include one or more of maximum memory usage, total memory usage, memory usage over time, maximum processor usage, total processor usage, processor usage over time, maximum network usage, total network usage, or network usage over time. Additionally or alternatively, the closest feature vector may be determined using at least one neural network trained to compare feature vectors of applications.

Additionally with or alternatively to using a database, the at least one processor may execute one or more runtime tests on the one or more applications to determine one or more characteristics comprising the profile. For example, as explained above with respect to FIG. 2, the one or more characteristics may include one or more of maximum memory usage, total memory usage, memory usage over time, maximum processor usage, total processor usage, processor usage over time, maximum network usage, total network usage, or network usage over time.

At steps 503 and 505, the at least one processor may determine a batch size for the at least one neural network based on the determined profile for the one or more applications. In the example of FIG. 5A, the at least one processor may test a plurality of batch sizes on the at least one neural network to determine the batch size that complements the profile for the one or more applications. For example, in step 503, the at least one processor may test a batch size on the at least one neural network and determine a profile for the at least one neural network associated with that batch size. The profile may comprise a runtime profile or any other data structure describing one or more hardware requirements or usages for the at least one neural network and the batch size. At step 505, the at least one processor may proceed if the determined profile for the at least one neural network complements (or matches) the determined profile for the one or more applications. If not, method 500 may return to step 503 to test another batch size. The next batch size for testing may be random or may be determined using Newton's method, quasi-Newtonian methods, or any other optimization technique.

The determined profile for the at least one neural network may complement or match the profile for the one or more applications when one or more qualities are small for one runtime profile but large for the other. For example, a profile with low memory intensity but high processor intensity may complement a profile with medium or high memory intensity but low processor intensity. In another example, a profile with medium memory intensity and low processor intensity may complement a profile with low or medium memory intensity and high or medium processor intensity. These complements may be determined applying thresholds to totals (e.g., keeping total processor intensity below one threshold, total memory intensity below another threshold, or the like), applying adjusting thresholds (e.g., applying thresholds to the qualities of the other profile based on values of the qualities in the one runtime profile), or the like. Additionally or alternatively, the profiles may be stored as feature vectors, and complementary profiles may be selected based on equalization of the dimensions of the summed feature vectors of the complementary profiles, satisfaction of one or more thresholds applied to one or more dimensions of the summed feature vectors of the complementary profiles, or the like.

In one example, the at least one processor may select the batch size that causes the at least one neural network to exhibit a profile having one or more associated characteristics at least a threshold distance from one or more characteristics of the profile for the one or more applications or resulting in minimal totals of each associated characteristic and a corresponding characteristic of the one or more characteristics of the profile for the one or more applications. As explained above, the one or more characteristics may include one or more of maximum memory usage, total memory usage, memory usage over time, maximum processor usage, total processor usage, processor usage over time, maximum network usage, total network usage, or network usage over time.

At step 507, the at least one processor may schedule the one or more applications and the at least one neural network based on the batch size. For example, the schedule may comprise a schedule of operations for one or more processors to execute the one or more applications and the at least one neural network with the selected batch size either concurrently or in parallel.

Figure 5B:
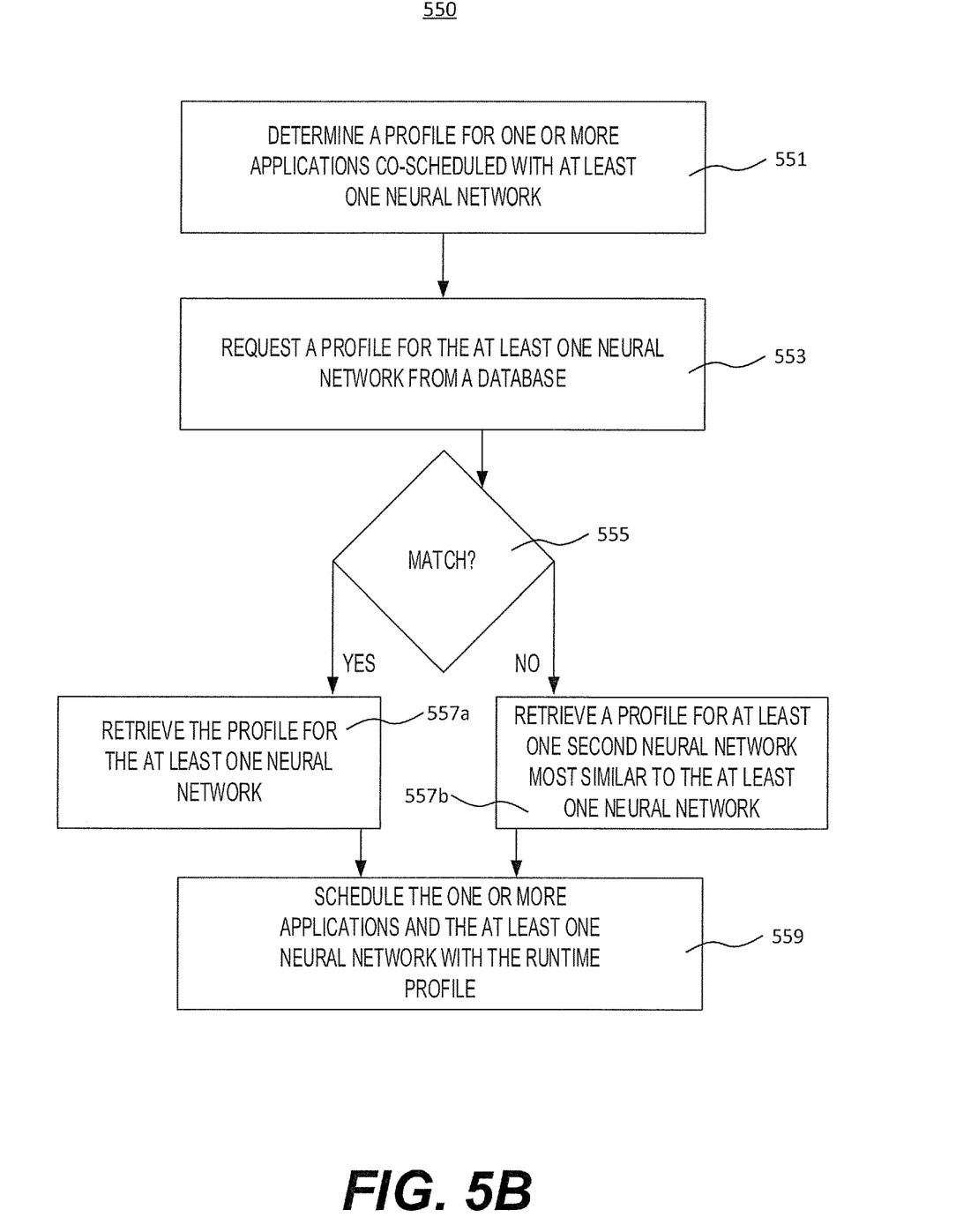
FIG. 5B is a flowchart of another exemplary method for scheduling a neural network for execution, according to embodiments of the present disclosure.

FIG. 5B is a flowchart of an exemplary method 550 for scheduling a neural network. Method 550 may be performed by at least one processor (e.g., processor 701 of FIG. 7). Although described as scheduling at least one neural network with one or more other applications, method 500 may be used to schedule a plurality of neural networks together, a plurality of neural networks with one or more other applications, or the like.

Method 550 may be an alternative to method 500. In other embodiments, method 550 and method 500 may be combined. For example, a profile may be retrieved using method

550 and a plurality of batch sizes based on the profile selected for testing using method 500.

At step 551, the at least one processor may determine a profile for one or more applications co-scheduled with at least one neural network. For example, the profile may comprise a runtime profile or any other data structure describing one or more hardware requirements or usages for the one or more applications. In some embodiments, as explained above with respect to FIG. 3, the at least one processor may retrieve the profile from a database. For example, the at least one processor may retrieve a profile from a database of profiles based on one or more characteristics of the one or more applications and, when no profile in the database matches the one or more applications, select a profile associated with one or more characteristics most similar to the one or more characteristics of the one or more applications. To determine the one or more characteristics most similar to the one or more characteristics of the one or more applications, the at least one processor may use one or more clustering algorithms on the one or more characteristics of the application and those of applications in the database. For example, the at least one processor may determine the profile associated with one or more characteristics with a minimal total distance to the one or more characteristics of the one or more applications or determine the profile associated with one or more characteristics with minimal distances between each associated characteristic and a corresponding characteristic of the one or more characteristics of the one or more applications.

Additionally with or alternatively to using one or more clustering algorithms, the at least one processor may use feature vector comparison, e.g., by determining the profile having a feature vector based on one or more associated characteristics closest to a feature vector based on the one or more characteristics of the one or more applications. The closest feature vector may be determined using a multi-dimensional distance, as explained above with respect to FIG. 3. The dimensions may include one or more of maximum memory usage, total memory usage, memory usage over time, maximum processor usage, total processor usage, processor usage over time, maximum network usage, total network usage, or network usage over time. Additionally or alternatively, the closest feature vector may be determined using at least one neural network trained to compare feature vectors of applications.

Additionally with or alternatively to using a database, the at least one processor may execute one or more runtime tests on the one or more applications to determine one or more characteristics comprising the profile. For example, as explained above with respect to FIG. 2, the one or more characteristics may include one or more of maximum memory usage, total memory usage, memory usage over time, maximum processor usage, total processor usage, processor usage over time, maximum network usage, total network usage, or network usage over time.

Using steps 553, 555, 557a, and 557b, the at least one processor may determine a batch size for the at least one neural network based on the determined profile for the one or more applications. For example, the at least one processor may use a profile associated with the at least one neural network and the batch size, which may comprise a runtime profile or any other data structure describing one or more hardware requirements or usages for the at least one neural network and the batch size. In the example of FIG. 5B, the at least one processor may retrieve the profile for the at least one neural network from a database based on whether a match occurs using the profile at step 555. For example, as explained above with respect to FIG. 4, if a match occurs, at step 557a, the at least one processor may retrieve the profile for the at least one neural network from a database of profiles based on one or more characteristics of the at least one neural network. On the other hand, if a match does not occur (e.g., when no profile in the database matches the at least one neural network), at step 557b, the at least one processor selects a profile associated with one or more characteristics most similar to the one or more characteristics of the at least one neural network. To determine the one or more characteristics most similar to the one or more characteristics of the at least one neural network, the at least one processor may use one or more clustering algorithms on the one or more characteristics of the at least one neural network and those of neural networks in the database. For example, the at least one processor may determine the profile associated with one or more characteristics with a minimal total distance to the one or more characteristics of the at least one neural network or determine the profile associated with one or more characteristics with minimal distances between each associated characteristic and a corresponding characteristic of the one or more characteristics of the at least one neural network.

Additionally with or alternatively to using one or more clustering algorithms, the at least one processor may use feature vector comparison, e.g., by determining the profile having a feature vector based on one or more associated characteristics closest to a feature vector based on the one or more characteristics of the at least one neural network. The closest feature vector may be determined using a multi-dimensional distance, as explained above with respect to FIG. 4. The dimensions may include one or more of a number of hidden layers, a number of nodes per layer, or a connection scheme between nodes. Additionally or alternatively, the closest feature vector may be determined using at least one neural network trained to compare feature vectors of neural networks.

The determined profile for the at least one neural network may complement or match the profile for the one or more applications when one or more qualities are small for one profile but large for the other. For example, a profile with low memory intensity but high processor intensity may complement a profile with medium or high memory intensity but low processor intensity. In another example, a profile with medium memory intensity and low processor intensity may complement a profile with low or medium memory intensity and high or medium processor intensity. These complements may be determined applying thresholds to totals (e.g., keeping total processor intensity below one threshold, total memory intensity below another threshold, or the like), applying adjusting thresholds (e.g., applying thresholds to the qualities of the other profile based on values of the qualities in the one profile), or the like. Additionally or alternatively, the profiles may be stored as feature vectors, and complementary profiles may be selected based on equalization of the dimensions of the summed feature vectors of the complementary profiles, satisfaction of one or more thresholds applied to one or more dimensions of the summed feature vectors of the complementary profiles, or the like.

In one example, the at least one processor may select a batch size for the at least one neural network that causes the at least one neural network to exhibit a profile having one or more associated characteristics at least a threshold distance from one or more characteristics of the profile for the one or more applications or resulting in minimal totals of each associated characteristic and a corresponding characteristic of the one or more characteristics of the determined profile for the one or more applications. As explained above, the one or more characteristics may include one or more of maximum memory usage, total memory usage, memory usage over time, maximum processor usage, total processor usage, processor usage over time, maximum network usage, total network usage, or network usage over time.

At step 559, the at least one processor may schedule the one or more applications and the at least one neural network based on the batch size. For example, the schedule may comprise a schedule of operations for one or more processors to execute the one or more applications and the at least one neural network with the selected batch size either concurrently or in parallel.

Figure 6:
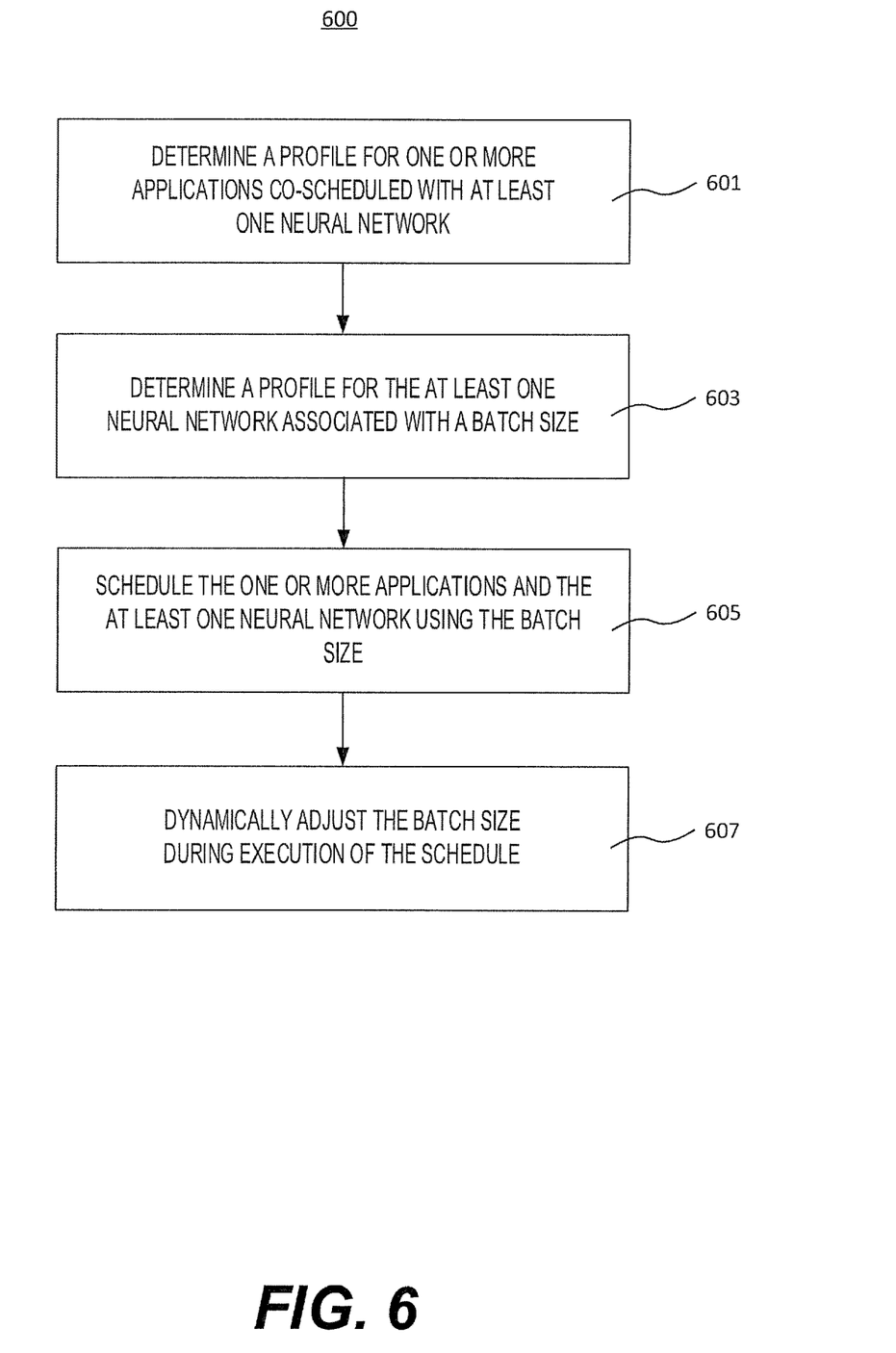
FIG. 6 is a flowchart of an exemplary method for dynamically adjusting an input batch size of a neural network during runtime, according to embodiments of the present disclosure.

FIG. 6 is a flowchart of an exemplary method 600 for scheduling and executing a neural network. Method 600 may be performed by at least one processor (e.g., processor 701 of FIG. 7). Although described as scheduling at least one neural network with one or more other applications, method 600 may be used to schedule a plurality of neural networks together, a plurality of neural networks with one or more other applications, or the like.

At step 601, the at least one processor may determine a profile for one or more applications co-scheduled with at least one neural network. For example, he profile may comprise a runtime profile or any other data structure describing one or more hardware requirements or usages for the one or more applications. In some embodiments, the at least one processor may execute step 501 of method 500 or step 551 of method 550 to determine the profile for the one or more applications.

At step 603, the at least one processor may determine a profile for the at least one neural network associated with a batch size. For example, the profile may comprise a runtime profile or any other data structure describing one or more hardware requirements or usages for the at least one neural network and the batch size. In some embodiments, the at least one processor may execute steps 503 and 505 of method 500 to test batches and determine the profile for the at least one neural network that complements or matches the profile for the one or more applications. Additionally or alternatively, the at least one processor may use steps 553, 555, 557a, and 557b or method 550 to retrieve profiles associated for (or most similar to) the at least one neural network and select a batch size based on which profile for the at least one neural network complements or matches the determined profile for the one or more applications.

At step 605, the at least one processor may schedule the one or more applications and the at least one neural network based on the batch size. For example, the schedule may comprise a schedule of operations for one or more processors to execute the one or more applications and the at least one neural network with the selected batch size either concurrently or in parallel.

At step 607, the at least one processor may dynamically adjust the batch size during execution of the generated schedule. For example, the at least one processor may monitor memory usage, processor usage, network usage, or the like and determine whether to increase or decrease the batch size to reduce any of the monitored qualities.

Figure 7:
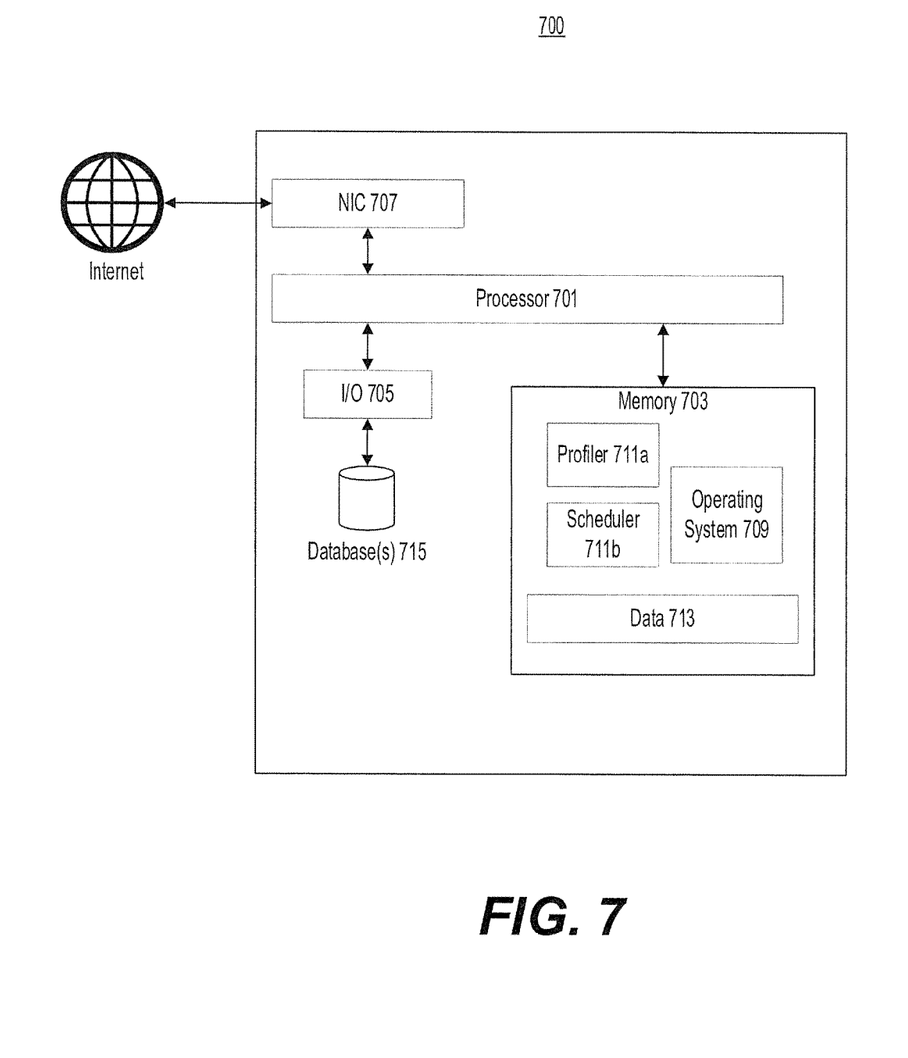
FIG. 7 is a depiction of an exemplary computer system for executing methods consistent with the present disclosure.

FIG. 7 is a depiction of an example system 700 for scheduling neural networks for execution, consistent with embodiments of the present disclosure. Although depicted as a server in FIG. 7, system 700 may comprise any computer, such as a desktop computer, a laptop computer, a tablet, or the like, configured with at least one processor to execute, for example, method 500 of FIG. 5A, method 550 of FIG. 5B, method 600 of FIG. 6, or any combination thereof.

As depicted in FIG. 7, computer 700 may have a processor 701. Processor 701 may comprise a single processor or a plurality of processors. For example, processor 701 may comprise a CPU alone or in combination with one or more hardware accelerators, a reconfigurable array (e.g., an FPGA or other ASIC), or the like.

Processor 701 may be in operable connection with a memory 703, an input/output module 705, and a network interface controller (NIC) 707. Memory 703 may comprise a single memory or a plurality of memories. In addition, memory 703 may comprise volatile memory, non-volatile memory, or a combination thereof. As depicted in FIG. 7, memory 703 may store one or more operating systems 709, a profiler 711a, and a scheduler 711b. Although depicted as part of memory 703, profiler 711a and scheduler 711b may comprise instructions built into or stored on processor 701.

Profiler 711a may include instructions to generate a profile (e.g., a runtime profile or any other data structure describing one or more hardware requirements or usages) for an application or a neural network (e.g., as explained in method 500 of FIG. 5A, method 550 of FIG. 5B, or method 600 of FIG. 6), and scheduler 711b may include instructions to generate a schedule for parallel or concurrent execution of at least one neural network with one or more applications (e.g., as explained in method 500 of FIG. 5A, method 550 of FIG. 5B, or method 600 of FIG. 6).

Input/output module 705 may store and retrieve data from one or more databases 715. For example, database(s) 715 may include a database of profiles for applications or profiles for neural networks to be retrieved and used by scheduler 711b, as described above.

NIC 707 may connect computer 700 to one or more computer networks. In the example of FIG. 7, NIC 707 connects computer 700 to the Internet. Computer 700 may receive data and instructions over a network using NIC 707 and may transmit data and instructions over a network using NIC 707. Moreover, computer 700 may receive neural networks or applications for co-scheduling (e.g., using profiler 711a and scheduler 711b) over a network using NIC 607, as described above.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for scheduling at least one neural network for execution, comprising:
   at least one memory storing instructions; and
   at least one processor configured to execute the instructions to cause the system to perform:
      determining a profile for one or more applications to be co-scheduled with the at least one neural network, the profile including a first set of hardware usage requirements for running the one or more corresponding applications;
      determining a batch size for the at least one neural network based on the determined profile for the one or more applications, the at least one neural network of the determined batch size having a second set of hardware usage requirements that complement the first set of hardware usage requirements such that a total of the first and second sets of hardware usage requirements is below a predetermined threshold; and
      scheduling the one or more applications and the at least one neural network based on the determined batch size.

2. The system of claim 1, wherein determining the profile comprises executing one or more runtime tests on the one or more applications to determine one or more characteristics comprising the profile.

3. The system of claim 2, wherein the one or more characteristics include one or more of maximum memory usage, total memory usage, memory usage over time, maximum processor usage, total processor usage, processor usage over time, maximum network usage, total network usage, or network usage over time.

4. The system of claim 1, wherein determining the profile comprises:
   retrieving a profile from a database of profiles based on one or more characteristics of the one or more applications; or
   when no profile in the database matches the one or more applications:
      selecting a profile associated with one or more characteristics most similar to the one or more characteristics of the one or more applications.

5. The system of claim 4, wherein selecting the profile associated with one or more characteristics most similar to the one or more characteristics of the one or more applications comprises at least one of:
   determining the profile associated with one or more characteristics with a minimal total distance to the one or more characteristics of the one or more applications; or
   determining the profile associated with one or more characteristics with minimal distances between each associated characteristic and a corresponding characteristic of the one or more characteristics of the one or more applications.

6. The system of claim 4, wherein selecting the profile associated with one or more characteristics most similar to the one or more characteristics of the one or more applications comprises determining the profile having a feature vector based on one or more associated characteristics closest to a feature vector based on the one or more characteristics of the one or more applications.

7. The system of claim 6, wherein the feature vector is determined using multiple dimensions.

8. The system of claim 7, wherein the dimensions include one or more of maximum memory usage, total memory usage, memory usage over time, maximum processor usage, total processor usage, processor usage over time, maximum network usage, total network usage, or network usage over time.

9. The system of claim 6, wherein the feature vector is determined using at least one neural network trained to compare feature vectors of applications.

10. The system of claim 1, wherein determining the batch size comprises testing a plurality of batch sizes on the at least one neural network to determine the batch size that complements the profile for the one or more applications.

11. The system of claim 10, wherein determining the batch size that complements the profile for the one or more applications comprises:
   determining the batch size that causes the at least one neural network to exhibit a profile having one or more associated characteristics at least a threshold distance from one or more characteristics of the profile for the one or more applications; or
   determining the batch size that causes the at least one neural network to exhibit a profile having one or more associated characteristics that result in minimal totals of each associated characteristic and a corresponding characteristic of the one or more characteristics of the profile for the one or more applications.

12. The system of claim 11, wherein the one or more characteristics include one or more of maximum memory usage, total memory usage, memory usage over time, maximum processor usage, total processor usage, processor usage over time, maximum network usage, total network usage, or network usage over time.

13. The system of claim 1, wherein determining the batch size comprises:

retrieving a profile for the at least one neural network from a database of profiles based on one or more characteristics of the at least one neural network; or when no profile in the database matches the at least one neural network:

selecting a profile associated with one or more characteristics most similar to the one or more characteristics of the at least one neural network.

14. The system of claim 13, wherein the one or more characteristics include one or more of a number of hidden layers, a number of nodes per layer, or a connection scheme between nodes.

15. The system of claim 13, wherein selecting the profile associated with one or more characteristics most similar to the one or more characteristics of the at least one neural network comprises at least one of:

determining the profile associated with one or more characteristics with a minimal total distance to the one or more characteristics of the at least one neural network; or determining the profile associated with one or more characteristics with minimal distances between each associated characteristic and a corresponding characteristic of the one or more characteristics of the at least one neural network.

16. The system of claim 13, wherein selecting the profile associated with one or more characteristics most similar to the one or more characteristics of the at least one neural network comprises determining the profile having a feature vector based on one or more associated characteristics closest to a feature vector based on the one or more characteristics of the at least one neural network.

17. The system of claim 16, wherein the feature vector is determined using multiple dimensions.

18. The system of claim 16, wherein the feature vector is determined using at least one neural network trained to compare feature vectors of neural networks.

19. A method for scheduling at least one neural network for execution, comprising:

determining a profile for one or more applications co-scheduled with the at least one neural network, the profile including a first set of hardware usage requirements for running the one or more corresponding applications;

determining a batch size for the at least one neural network based on the determined profile for the one or more applications, the at least one neural network of the determined batch size having a second set of hardware usage requirements that complement the first set of hardware usage requirements such that a total of the first and second sets of hardware usage requirements is below a predetermined threshold; and scheduling the one or more applications and the at least one neural network based on the determined batch size.

20. A non-transitory computer-readable storage medium storing a set of instructions that is executable by at least one processor to cause the processor to perform a method for scheduling a neural network for execution, the method comprising:

determining a profile for one or more applications co-scheduled with at least one neural network, the profile including a first set of hardware usage requirements for running the one or more corresponding applications;

determining a batch size for the at least one neural network based on the determined profile for the one or more applications, the at least one neural network of the determined batch size having a second set of hardware usage requirements that complement the first set of hardware usage requirements such that a total of the first and second sets of hardware usage requirements is below a predetermined threshold; and scheduling the one or more applications and the at least one neural network based on the batch size.

\* \* \* \* \*